Patented Aug. 25, 1959

2,901,396
PREPARATION OF PHARMACEUTICAL LIVER PRODUCTS

Sheldon H. Lewis, Park Forest, La Verne W. Van Ness, Bradley, and Alex Lukas, Chicago, Ill., assignors to Armour and Company, Chicago, Ill., a corporation of Illinois No Drawing. Application May 26, 1955
Serial No. 511,426

3 Claims. (Cl. 167—74.6)

This invention relates to the preparation of oral and parenteral liver products, and more particularly to a process for preparing pharmaceutical liver liquids of improved physical stability.

It is an object of this invention to provide a process for preparing liquid liver products suitable for oral and parenteral administration having a prolonged shelf life. Another object is to provide a process for preparing aqueous liver concentrates in which "shedding," i.e. precipitation, during prolonged storage is substantially eliminated. A further object is the provision of an anti-anemia preparation in which a significantly increased amount of folic acid can be maintained in physically stable solution. Still another object is the provision of a method improving the yield and stability of vitamin $B_{12}$ obtained from liver tissue in liquid anti-anemia products.

One aspect of this invention involves proteolyzing an aqueous liver concentrate with a proteinase having an optimal activity in the neutral pH range, and fractionating the proteolyzed liver concentrate by selective heat-denaturation.

The starting material for this process may be any aqueous anti-anemia concentrate of liver tissue. Preferably, this aqueous concentrate is derived from mammalian liver tissue, and especially desirable stabilization is achieved with bovine and porcine liver concentrates, or mixtures of bovine and porcine liver concentrates. Hitherto, it has been most difficult to prepare physically stable pharmaceutical liquids from porcine liver tissue and mixtures of porcine and bovine liver tissues, and although the stability of any aqueous liver concentrate may be improved by this method, it is especially advantageous in the preparation of stabilized anti-anemia products derived from porcine liver tissue and from mixtures of porcine and bovine liver tissue. One method of obtaining the aqueous liver concentrate starting material for this process involves comminuting fresh mammalian livers by a method such as hashing or grinding, extracting the comminuted liver tissue with water and separating the undissolved, heatcoagulable tissue residue from the aqueous extract. This aqueous liver extract may be employed directly in the process of this invention or it may be evaporated to the consistency of a paste to facilitate storage and transport of the material.

The proteolysis step of this process may be carried out by mixing an aqueous liver concentrate with any proteinase having an optimal activity in the neutral pH range, and then incubating the resulting mixture to produce a proteolytic digest of the aqueous liver concentrate. The aqueous liver concentrate utilized in this step should have a solids content of less than about 70%. Better results are achieved when the solids content of this liver concentrate is between 35 and 60%, and an optimal proteolysis may be obtained when this starting material has a solids content of about 50%. The proteinase employed in this digestion step should have an optimal proteolytic activity within the range of about pH 6 to 8.5. Preferably, a mixture of proteinases having the critical optimal pH range of activity is employed herein, such as are contained in crude pancreas tissue preparations. These crude pancreas preparations are commonly referred to as "pancreatin," and contain, in addition to other enzymes, a wide spectrum of proteinases. The principal proteinases of pancreas tissue having the critical pH range of optimal activity are trypsin and chymotrypsin. Although proteolytic enzymes derived from other mammalian tissues or from other organisms may be used in this process, especially desirable results are achieved with mixtures of chymotrypsin and trypsin. Also, this proteinase may be derived from a vegetable source, such as papaya (papain), fig (ficin) and pineapple (bromelin).

The aqueous liver concentrate, containing the specified proteinase substance, may be incubated at a temperature of at least about 20° C. for a period of time such as to produce a proteolytic digest thereof. Preferably, the temperature during this step is less than about 50° C. to prevent untimely destruction of the proteinase substance. The period of time in which the liver proteins are suitably digested may be decreased when a higher concentration of the enzyme is included therein, or when a higher incubation temperature is employed. We have found that when from 1 to 3% by weight of a pancreatin preparation, having a proteinase potency of 1:90 is included in the aqueous liver concentrate, proteolysis may be obtained at a temperature of about 35 to 40° C. within a period of about 16 hours.

The selective heat-denaturation of a proteolyzed aqueous liver concentrate in this process may be obtained by rapidly elevating the temperature thereof to the boiling point, and then rapidly chilling the boiled material to a temperature such that precipitation of the heat-denatured portion thereof is obtained. Then, the resulting precipitate may be separated from the supernatant liquid and discarded. The proteolyzed aqueous liver concentrate may be purified prior to this selective heat-denaturation step by fractionation with an organic precipitating solvent. For example, the proteolyzed liver concentrate may be purified by fractionation with a water-miscible organic precipitating solvent such as an alcohol of the group consisting of ethanol and methanol in such amount as to produce an alcohol concentration therein of about 60 to 80% by volume. However, better results are achieved when the alcohol concentration in this mixture is about 70% by volume. The precipitate formed in the alcohol mixture may be separated from the supernatant liquid thereof, and such precipitate may be utilized in the preparation of other pharmaceutical liver products. Also, the separated precipitate may be re-extracted with the alcohol to increase the yield of alcohol-soluble liver material, and the re-extracted alcohol precipitate may be subjected to further extraction with alcohol to again increase the yield of alcohol-soluble material. This alcohol-soluble liver fraction, or a pool of such fractions, may be further purified by chilling the solution to a temperature of less than about 10° C., preferably about +5 to —5° C., and maintained at this temperature for a period of about 16 hours. The precipitate thereupon formed, which is of a lipoidal nature, may be separated from the dissolved liver factors by a method such as centrifugation or filtration. The clarified alcohol-soluble liver fraction may then be subjected to a distillation in vacuo to evaporate the alcohol. This aqueous alcohol-soluble liver fraction thereafter being subjected to the selective heat-denaturation step of this process. However, the advantages of this selective heat-denaturation step may be achieved with any proteolyzed liver concentrate as hereinbefore described.

The proteolyzed aqueous liver concentrate employed in this selective heat-denaturation step may have a solids content of less than about 40%. Better results are achieved when the solids content of this liver concentrate is between 15 and 40%, and especially desirable results are obtained when this solids content is about 25%. The heat-denaturation should be obtained by rapidly heating the proteolyzed liver concentrate to a temperature of at least about 70° C. at atmospheric pressure. Preferably, the liver concentrate is heated to the boiling point at atmospheric pressure, although a lower temperature may be utilized at superatmospheric pressures. The liver concentrate may be agitated during the heat-denaturation step to minimize carmelization thereof. When a more vigorous agitation of the concentrate is employed a greater dispersion and turnover of the liver constituents may be obtained, and a larger amount of heat energy may be applied to such concentrate. On the other hand, when less vigorous agitation of the liver concentrate is utilized, a smaller amount of heat energy should be applied to such concentrate. When the temperature of the liver concentrate has been elevated to the critical range, the heating may be discontinued and such concentrate chilled rapidly to a temperature such as to precipitate the heat-denatured proteinaceous substances therein. Preferably, as soon as the liver concentrate has achieved the boiling point, the heating is discontinued, and such concentrate is immediately chilled to the lower temperature. This lower temperature may be less than about 10° C., and optimum results are obtained at a temperature of less than about 5° C. The temperature of the boiled liver concentrate may be maintained at the lower temperature for a period of about 16 hours to coalesce the precipitate thereupon formed. Thereafter, the precipitate may be separated from the undenatured liver substances, and discarded. The resulting filtrate may be sterilized, filled into pharmaceutical vials, and the filled vials capped and sealed to obtain a liquid liver product.

We have found that, whereas liquid liver products prepared according to conventional methods are capable of maintaining in physically stable solution only 2 (porcine) to 4 (bovine) mg. of folic acid per cc., liver liquids obtained by the present process hold up to 10 mg. of folic acid per cc. in physically stable solution.

This invention can be more fully illustrated by the following specific examples:

*Example I*

A concentrated aqueous extract of beef liver tissue, having a solids content of 67.4%, was diluted to a solids content of 50% with water. One (1) kg. of the diluted liver concentrate, containing 500 gms. of solids, was combined with ammonium hydroxide in such amount as to produce a pH therein of 6.8. Pancreatin having a proteinase activity of 1:90, in the amount of 15 grams, was added to this neutralized liver concentrate. The resulting mixture was heated to a temperature of 37–40° C., and maintained at such temperature for a period of 16 hours while undergoing continuous, slow agitation.

After the proteolysis had been completed, 3.05 liters of a 70% alcohol solution, composed of 2.25 liters of 95% 3A alcohol and 0.3 liter of water, was slowly added to the proteolyzed liver concentrate. This ethanol mixture was agitated for a period of one (1) hour, thereby coagulating the precipitate formed in such mixture. The alcohol-soluble fraction (supernatant liquid) was separated from this precipitate by decantation, and such precipitate was dried in vacuo.

The alcohol-soluble fraction was chilled to a temperature of −4° C. and maintained at such temperature for a period of 16 hours. The lipoidal precipitate formed during this chilling step was separated from the supernatant liquid by filtration at a temperature of −4° C., and discarded. This clarified alcohol-soluble liver fraction was subjected to distillation in vacuo to evaporate the ethanol. This aqueous alcohol-soluble liver fraction, which had a solids content of 35–40%, was diluted with water to a solids content of about 25%. Then, the diluted solution was flash-heated to the boiling point at atmospheric pressure, while undergoing vigorous agitation. Upon achieving the boiling point, heating was immediately discontinued, and the boiled solution flash-cooled to a temperature of 4° C. The precipitate formed therein during the chilling step was coalesced by maintaining the boiled liver concentrate at a temperature of 4° C. for a period of 16 hours.

This precipitate was separated from the heat-soluble liver fraction by filtration. Celite #535 filter aid, in the amount of 2% by weight, was mixed with this heat-soluble fraction, and the resulting mixture was clarified by filtration in a filter press having a precoat of such filter aid on the filter surface. The filtrate was concentrated by distillation in vacuo to the consistency of a paste preparatory to the production of N.F. or U.S.P. liver products. In the alternative, this filtrate may be utilized directly in producing oral liver liquids and 2 gamma liver injection, crude U.S.P. products.

*Example II*

The following demonstrates a comparison of liver liquid products obtained by processes involving (A) enzyme digest, (B) heat-chill, (C) enzyme digest and heat-chill, and (D) control.

The starting material for each of the processes A, B, C and D was 3–1000 gm. aliquot of an aqueous liver concentrate having a solids content of 67.4. This liver concentrate was diluted with water to a solids content of 50%, and the pH thereof was adjusted to 6.8.

The control product (D) was prepared by mixing with each 1000 gm. aliquot of diluted liver concentrate 0.7 gal. of 70%, 3 A alcohol per pound of solids therein. The resulting precipitate was separated from the alcohol-soluble fraction by decantation. The alcohol-soluble fraction from one of these aliquots (D1) was distilled in vacuo to remove the alcohol therein, and then the aqueous alcohol-soluble fraction was concentrated to the consistency of a paste. The separated precipitate of this aliquot (alcohol-insoluble fraction) was dried in vacuo.

The separated precipitate from another of these aliquots was subjected to a second 70% alcohol extraction. The first and second alcohol-soluble fractions herein were pooled and subsequently treated according to the method utilized in D1. This product was designated D2.

The third aliquot was subjected to a second and third extraction with alcohol, and the resulting extracts were pooled and treated according to the method of D1 to obtain product D3.

The enzyme digest (A) products were prepared according to the process for product D except that prior to alcohol extraction the aqueous liver concentrate was proteolyzed. The proteolyzing of the liver concentrate was obtained by mixing therewith pancreatin having a proteinase activity of 1:90 in the amount of 15 gms., to each 1000 gm. aliquot. The resulting mixture was heated to a temperature of 37 to 40° C., and maintained at such temperature for a period of 16 hours while undergoing intermittent agitation. This proteolyzed liver concentrate was then subjected to alcohol extraction according to the method of D, and the resulting products were designated successively A1, A2, and A3.

The heat-chill products (B) were prepared according to the method of D except that subsequent to the removal of alcohol from the alcohol-soluble fraction each aliquot was subjected to a heat-chill clarification. This heat-chill clarification was obtained by diluting the aqueous alcohol-soluble fraction to a solids content of 25%. This diluted solution was flash-heated to the boiling point at atmospheric pressure, while undergoing vigorous agitation. Upon achieving the boiling point, heating was immediately discontinued, and the boiled solution flash-cooled to a temperature of 4° C. The resulting precipitate was coalesced by maintaining the boiled liver concentrate at a temperature of 4° C. for a period of 16 hours. This precipitate was separated from the aqueous liver concentrate by filtration. The resulting aqueous liver concentrate was concentrated to the consistency of a paste, and the products were successively designated B1, B2 and B3.

The enzyme digest and heat-chill products (C) were prepared according to the processes described for products A, B and D in that the aqueous liver concentrate was first subjected to proteolysis, then extracted with alcohol to obtain successively 1, 2 and 3 alcohol-soluble fractions, and after distillation to remove alcohol, the aqueous alcohol soluble fractions were subjected to heat-chill clarification and then concentrated to the consistency of a paste. The resulting products were designated successively C1, C2 and C3

These products were analyzed and the results were as follows:

The F products contain "fat floaters" in the alcohol-soluble fractions, and such F products had a fatty and very bitter taste. The E products contained no fat in a soluble fraction, but such fractions still had a somewhat bitter taste. The C and D products contained no fat in the alcohol-soluble fraction, and such fraction had a bitter but satisfactory taste.

*Example IV*

The liver products obtained in Examples II and III were incorporated into oral liver liquid preparations according to the National Formulary. The resulting preparations were subjected to analysis for physical stability, and the results are described in the following tables, wherein (+) denotes the presence of insoluble

|  | A1 | A2 | A3 | B1 | B2 | B3 | C1 | C2 | C3 | D1 | D2 | D3 |
|---|---|---|---|---|---|---|---|---|---|---|---|---|
| Yield of Total Solids (Percent) | 99.6 | 99.7 | 99.8 | 95.8 | 94.0 | 96.6 | 96.1 | 98.0 | 96.5 | 99.7 | 99.0 | 99.9 |
| alcohol-soluble fraction | 56.4 | 76.7 | 88.4 | 43.0 | 61.2 | 71.6 | 46.4 | 67.6 | 75.0 | 49.4 | 72.0 | 77.7 |
| alcohol-insoluble fraction | 43.2 | 23.0 | 11.4 | 52.8 | 32.8 | 25.0 | 49.7 | 30.4 | 21.5 | 50.3 | 27.0 | 22.2 |
| Vitamin $B_2$ (mg. per gm.—dry): | | | | | | | | | | | | |
| alcohol-soluble fraction | | | 0.288 | | | 0.329 | | | 0.310 | | | 0.388 |
| alcohol-insoluble fraction | | | 0.336 | | | 0.352 | | | 0.314 | | | 0.347 |
| Niacin (mg. per gm.—dry): | | | | | | | | | | | | |
| alcohol-soluble fraction | | | 1.66 | | | 1.70 | | | 1.76 | | | 1.87 |
| alcohol-insoluble fraction | | 0.09 | 0.03 | | 0.092 | 0.041 | | 0.061 | 0.075 | | 0.082 | 0.04 |
| Choline (mg. per gm.—dry): | | | | | | | | | | | | |
| alcohol-soluble fraction | | | 29.2 | | | 34.6 | | | 32.5 | | | 30.5 |
| Water—Insoluble Content (Percent—dry alcohol-soluble fraction) | 1.42 | 1.44 | 1.16 | 0.06 | 0.12 | 0.24 | 0.07 | 0.12 | 0.02 | 0.68 | 1.16 | 1.2 |

These results indicate that the product obtained by the process involving enzyme digest and heat-chill are superior to those obtained to the other processes. Also, these products prove satisfactory from a taste standpoint.

*Example III*

The following demonstrates comparative products obtained from pork and beef aqueous liver concentrates by the enzyme digest and heat-chill process.

The beef products described herein were prepared according to the method of Example II and designated, respectively, C1, C2 and C3.

The porcine source material for these products was porcine aqueous liver concentrate having a total solids content of 70.8%. These products were prepared according to the method utilized in preparing products C in Example II. The resulting products were designated E1, E2 and E3.

Pork and beef products contained herein were prepared with control products prepared according to the method D of Example II. The porcine control products were designated, respectively, F1, F2 and F3.

The products prepared herein were analyzed, and the results were as follows:

matter formed in the product and (—) denotes the absence of insoluble matter formed therein:

| Product | Physical Stability | Product | Physical Stability |
|---|---|---|---|
| A1 | + | D1 | + |
| A2 | + | D2 | + |
| A3 | + | D3 | + |
| B1 | — | E1 | — |
| B2 | — | E2 | — |
| B3 | — | E3 | — |
| C1 | — | F1 | + |
| C2 | — | F2 | + |
| C3 | — | F3 | + |

These results demonstrate the improved physical stability of both pork and beef liquid liver products prepared according to the method of this invention, i.e. products C and E, respectively.

While in the foregoing specification various embodiments of this invention have been set forth and specific details thereof elaborated for the purpose of illustration,

|  | E1 | E2 | E3 | F1 | F2 | F3 | C1 | C2 | C3 | D1 | D2 | D3 |
|---|---|---|---|---|---|---|---|---|---|---|---|---|
| Yield of Total Solids (Percent) | 97.8 | 92.0 | 92.5 | 99.7 | 99.4 | 98.5 | 96.1 | 98.0 | 96.5 | 99.7 | 99.0 | 99.9 |
| alcohol-soluble fraction | 37.8 | 53.5 | 64.4 | 43.7 | 61.3 | 63.8 | 46.4 | 67.6 | 75.0 | 49.4 | 72.0 | 77.7 |
| alcohol-insoluble fraction | 60.0 | 38.5 | 28.1 | 56.0 | 38.1 | 34.7 | 49.7 | 30.4 | 21.5 | 50.3 | 27.0 | 22.2 |
| Vitamin $B_2$ (mg. per gm.—dry): | | | | | | | | | | | | |
| alcohol-soluble fraction | 0.322 | 0.265 | 0.276 | 0.294 | 0.310 | 0.280 | | | 0.310 | | | 0.388 |
| alcohol-insoluble fraction | 0.331 | 0.262 | 0.220 | 0.303 | | 0.212 | | | 0.314 | | | 0.347 |
| Niacin (mg. per gm.—dry): | | | | | | | | | | | | |
| alcohol-soluble fraction | 3.18 | 2.00 | 2.02 | 2.28 | 2.22 | 2.29 | | | 1.76 | | | 1.87 |
| alcohol-insoluble fraction | 0.28 | 0.09 | 0.035 | 0.437 | 0.068 | 0.023 | | | 0.075 | | | 0.04 |
| Choline (mg. per gm.—dry alcohol-soluble fraction) | 42.6 | 34.7 | 30.4 | 38.6 | 32.1 | 33.4 | | | 32.5 | | | 30.5 |
| Water-Insoluble Content (Percent—dry alcohol-soluble fraction) | 0.14 | 0.08 | 0.17 | 0.43 | 0.70 | 2.12 | 0.07 | 0.12 | 0.02 | 0.68 | 1.16 | 1.2 |

We claim:
1. In a process for preparing a pharmaceutical liver liquid of improved physical stability, the steps of mixing an aqueous liver concentrate having a pH within the neutral pH range with a proteolytic enzyme substance having an optimal activity in said neutral pH range, incubating the resulting mixture to proteolyze said aqueous liver concentrate, fractionating said proteolyzed liver concentrate by combining therewith an alcohol of the group consisting of ethanol and methanol in such amount as to produce an alcohol concentration therein of from 60 to 80% by volume, separating the precipitate thereupon formed from the alcohol-soluble liver fraction, removing a substantial portion of the alcohol contained in said alcohol-soluble liver fraction, rapidly heating the resulting aqueous alcohol-soluble liver fraction to about the boiling point thereof at the atmospheric pressure employed to selectively heat-denature a portion of the liver substances contained therein, chilling the boiled liver concentrate to a temperature of less than 10° C. at which a precipitate of the heat-denatured liver substances is obtained, and separating said precipitate from the aqueous liver concentrate.

2. In a process for preparing a pharmaceutical liver liquid of improved physical stability, the steps of mixing an aqueous liver concentrate having a pH of from 6 to 8.5 with a proteolytic enzyme substance having an optimal activity within said pH range, incubating the resulting mixture to proteolyze said aqueous liver concentrate, combining with said proteolyzed aqueous liver concentrate an alcohol of the group consisting of ethanol and methanol in such amount as to produce an alcohol concentration therein of from 60 to 80% by volume, chilling the resulting alcohol mixture to a temperature of less than 10° C. to form a precipitate therein, separating said precipitate from the alcohol-soluble liver fraction, removing a substantial portion of the alcohol from said alcohol-soluble liver fraction, rapidly heating the resulting aqueous alcohol-soluble liver fraction to a temperature of at least about 70° C. and about the boiling point of said liver fraction at normal atmospheric pressure to selectively heat-denature a portion of the liver substances contained therein, rapidly chilling the heated aqueous liver concentrate to a temperature of less than 10° C. at which a precipitate of the heat-denatured liver substances is obtained, and separating said precipitate from the aqueous liver concentrate.

3. In a process for preparing a pharmaceutical liver liquid of improved physical stability, the steps of mixing an aqueous liver concentrate having a pH within the range of pH 6.0 to 8.5 with a proteolytic enzyme having an optimal activity in said pH range, incubating the resulting mixture to proteolyze said aqueous liver concentrate, rapidly heating the proteolyzed liver concentrate to about the boiling point thereof under normal atmospheric pressure to selectively heat-denature a portion of the liver substances contained therein, rapidly chilling the boiled liver concentrate to a temperature of from +5 to −5° C. at which a precipitate of the heat-denatured liver substances is obtained, and separating said precipitate from the aqueous liver concentrate.

References Cited in the file of this patent

UNITED STATES PATENTS

| | | |
|---|---|---|
| 2,388,417 | Jones | Nov. 6, 1945 |
| 2,494,726 | Sifferd | Jan. 17, 1950 |

FOREIGN PATENTS

| | | |
|---|---|---|
| 595,111 | Great Britain | Nov. 26, 1947 |
| 643,331 | Great Britain | Sept. 20, 1950 |

OTHER REFERENCES

Davis: Brit. Med. Jour., May 29, 1943, p. 655.

Sperry: J. Biol. Chem., vol. 81, No. 2, February 1929, pp. 251–265, (pp. 261–263 pert.).

U.S. Disp., 24th ed., 1947, Lippincott Co., Philadelphia, p. 816.